United States Patent
Becker et al.

(10) Patent No.: US 10,398,249 B2
(45) Date of Patent: Sep. 3, 2019

(54) COOKING DEVICE WITH A STEAM-GENERATING ELEMENT

(71) Applicant: Miele & Cie. KG, Guetersloh (DE)

(72) Inventors: Torben Becker, Bielefeld (DE); Julia ten Haaf, Beckum (DE)

(73) Assignee: MIELE & CIE. KG, Guetersloh (DE)

( * ) Notice: Subject to any disclaimer, the term of this patent is extended or adjusted under 35 U.S.C. 154(b) by 1200 days.

(21) Appl. No.: 14/049,281

(22) Filed: Oct. 9, 2013

(65) Prior Publication Data
US 2014/0097173 A1    Apr. 10, 2014

(30) Foreign Application Priority Data
Oct. 10, 2012   (DE) .................. 10 2012 109 631

(51) Int. Cl.
A47J 27/04 (2006.01)
F24C 15/32 (2006.01)
F01K 5/02 (2006.01)

(52) U.S. Cl.
CPC .............. *A47J 27/04* (2013.01); *F01K 5/02* (2013.01); *F24C 15/327* (2013.01)

(58) Field of Classification Search
CPC ... A21B 3/04; A21B 1/24; F22B 1/285; F22B 1/28; F22B 1/281; F22B 37/00; F22B 37/42; E03C 1/102; F22D 11/003; F24C 15/327; F24C 14/005; F24C 15/32; F24C 1/14; A47J 27/16; A47J 31/46; A47J 31/44; A47J 31/30; A47J 2027/006; A47J 2027/008; A47J 27/18; F16K 15/14; G07F 9/105

USPC ....... 219/369, 401, 520, 391, 393, 395, 396, 219/397, 398, 399, 402, 405, 407, 408, 219/409, 410; 392/402; 126/20, 369; 99/293, 299, 300, 330, 352, 357, 403, 99/407, 417, 447, 448, 473, 475; 426/233, 510, 523, 524

See application file for complete search history.

(56) References Cited

U.S. PATENT DOCUMENTS 4,338,964 A  *  7/1982 Schoepe .................. F16K 31/20
                                                    137/426
7,677,161 B2 *  3/2010 Matsuo .................. F24C 15/327
                                                    219/400

(Continued)

FOREIGN PATENT DOCUMENTS

| DE | 102004007236 A1 | 9/2005 |
|---|---|---|
| DE | 102006057683 B3 | 6/2008 |
| DE | 102007024007 A1 | 11/2008 |

*Primary Examiner* — Tu B Hoang
*Assistant Examiner* — Masahiko Muranami
(74) *Attorney, Agent, or Firm* — Leydig, Voit & Mayer, Ltd.

(57) ABSTRACT

A cooking device includes an oven chamber operable to receive food that is to be cooked, a steam-generating element for generating steam, and a coupling element through which water used for generating steam is fed, at least in part, to the steam-generating element. The coupling element includes a connecting element configured to connect to a fixed water connection. A pipe element is disposed between the coupling element and the steam-generating element and is configured to establish a flow-connection suitable for conveying water. The pipe element includes a free-fall section and a water-conveying element is at least partially disposed in the free-fall section.

10 Claims, 5 Drawing Sheets

(56) References Cited

U.S. PATENT DOCUMENTS

| | | | | |
|---|---|---|---|---|
| 2001/0022300 A1* | 9/2001 | Ushijima | ............... | F22B 1/281 |
| | | | | 219/688 |
| 2003/0192436 A1* | 10/2003 | Schreiner | ............... | A47J 36/00 |
| | | | | 99/410 |
| 2005/0109215 A1* | 5/2005 | Helm | ............... | F24C 15/327 |
| | | | | 99/330 |
| 2007/0138160 A1* | 6/2007 | Ando | ............... | A21B 3/04 |
| | | | | 219/401 |
| 2010/0021146 A1* | 1/2010 | Murai | ............... | A21B 3/04 |
| | | | | 392/394 |
| 2010/0142935 A1* | 6/2010 | Kim | ............... | D06F 39/008 |
| | | | | 392/394 |
| 2010/0230397 A1* | 9/2010 | Ohashi | ............... | A21B 3/04 |
| | | | | 219/401 |
| 2011/0095013 A1 | 4/2011 | Utsumi et al. | | |

\* cited by examiner

COOKING DEVICE WITH A STEAM-GENERATING ELEMENT

CROSS REFERENCE TO RELATED APPLICATIONS

This application claims priority from German Patent Application No. 10 2012 109 631.7, filed Oct. 10, 2012, which is hereby incorporated by reference herein in its entirety.

FIELD

The present invention relates to a cooking device with a steam-generating element.

BACKGROUND

Some cooking devices need water in order for the food to be prepared. For example, cooking devices with a steam cooking function need water in order to generate the steam. Such steam cooking methods usually offer a relatively gentle preparation capability since certain vitamins are retained, for example, when vegetables are being cooked.

In another cooking method, the water is used to modify the moisture level in the air as a function of the cooking process. For this purpose, with this method—commonly called "climate-controlled cooking"—steam is generated and introduced into the oven chamber of the device during the cooking process. For example, climate-controlled cooking is highly advantageous for the long cooking times needed for large roasts since, thanks to the intermittent steaming, the meat does not dry out. Climate-control is also often advantageous for baking bread and rolls since steaming at the beginning of the baking procedure prevents the dough surface from cracking.

As a rule, cooking devices with a steam-cooking or climate-controlled cooking function have a water tank to supply the water that is needed. The water tank is usually filled before the beginning of the process. For this purpose, the tank can be removed and filled, for example, under a water faucet. The state of the art also discloses cooking devices that have a suction element through which the water can be transferred, for instance, from a cup into the water tank. Other known cooking devices are those that are connected to the water supply source via a fixed water connection. The cooking device autonomously draws in the amount of water needed. The advantage of such a system with a fixed water connection is that the user no longer has to make sure that there is a sufficient amount of water in the water tank for the envisaged cooking process.

In the case of such a fixed water connection, the requirement exists that the water admitted into the cooking device must not be sucked back into the water supply system on the side where the connection is located. In order to meet this requirement, there is often a free-fall section where the water cannot accumulate. If negative pressure arises in the water supply system, it is not the water but rather merely air that is sucked back into the system.

However, a problem can be encountered when the water is admitted via a fixed water connection, namely, that the inflowing water displaces air from the lines or from the tank. For example, the air can be allowed to escape via the path through which the steam is also fed into the oven chamber during the cooking operation. Unfortunately, it often occurs that water is diverted and entrained, so that water collects in the oven chamber. The water is usually particularly prone to being diverted while it is running through the free-fall section.

SUMMARY

In an embodiment, the present invention provides a cooking device including an oven chamber operable to receive food that is to be cooked, a steam-generating element for generating steam, and a coupling element through which water used for generating steam is fed, at least in part, to the steam-generating element. The coupling element includes a connecting element configured to connect to a fixed water connection. A pipe element is disposed between the coupling element and the steam-generating element and is configured to establish a flow-connection suitable for conveying water. The pipe element includes a free-fall section and a water-conveying element is at least partially disposed in the free-fall section.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the present invention is to put forward a cooking device having a simple fixed water connection with which water can be drawn in via a free-fall section.

A cooking device according to an embodiment of the invention has at least one oven chamber for food that is to be cooked as well as a steam-generating element for generating steam. The water used for generating the steam can be fed to the steam-generating element, at least in part, via at least one coupling element. The coupling element has at least one connecting element that is suitable to be connected to a fixed water connection. Between the connecting element and the steam-generating element, there is at least one pipe element that establishes a flow-connection that is suitable for conveying water and that comprises at least one free-fall section. At least one water-conveying element is arranged, at least partially, in the free-fall section.

The cooking device according to embodiments of the invention has many advantages. A major advantage is that at least one water-conveying element is arranged, at least partially, in the free-fall section. The water-conveying element ensures that the water is not diverted while it is being admitted. While the water is being admitted, it runs in the free-fall section at least partially along the water-conveying element and cannot be entrained by escaping air or the like. Advantageously, the water runs along the water-conveying element while the air escapes in the opposite direction through the pipe element. It is especially advantageous that the stipulated requirement for a free-fall section is fulfilled and, at the same time, that it is possible for the inflowing water to be conveyed without being diverted.

In particular, the coupling element provides at least one flow connection through which water can be fed to the steam-generating element. The coupling element comprises at least one connecting element that is suitable for coupling the cooking device or the steam-generating element to a fixed water connection system. Here, the fixed water connection is especially a tapping fixture of a drinking water supply system and/or of a drinking water supply line and/or of a supply line containing suitable water. The connecting element can preferably be coupled to a water faucet and/or other commonly used connections of a drinking water supply system or the like.

The free-fall section is especially suited for preventing water from being sucked back into the drinking water supply system. In the free-fall section, the water can run down unhindered and essentially due to the force of gravity. This ensures that no water can accumulate there that could then be sucked back into the drinking water supply system.

Preferably, the pipe element provides at least one flow connection that is suitable for conveying steam. This is advantageous since the pipe element is suitable for admitting water as well as for discharging the steam from the steam-generating element. As a result, the number of components can be reduced and thus costs can also be lowered.

The pipe element especially has at least one steam outlet element. It is possible and preferable for the steam outlet element to be connected to at least one flow connection leading into the oven chamber through which the steam can be fed into the oven chamber. The steam outlet element, together with the flow connection leading into the oven chamber, can be at least partially configured and suitable for at least partially venting the pipe element and/or the steam-generating element. Particularly when water is being admitted, such venting can be advantageous or even necessary.

In particular, the steam outlet element is arranged, at least partially, in an area of the water-conveying element. Preferably, the steam inlet element is arranged above the lower end of the water-conveying element.

Especially preferably, the water-conveying element starts above the steam outlet element and/or it extends to below the steam outlet element. Such an arrangement is especially advantageous since the water-conveying element conveys the water as far as possible away from the steam outlet element and, as a result, prevents the inflowing water from being diverted, especially in the area of the steam outlet element. Thus, no water droplets and no water can get into the oven chamber via the steam outlet element while the water is being admitted.

It is possible for the steam outlet element to be arranged at a distance from the connecting element and for the pipe element to have at least one collecting area above the steam outlet element. The collecting area is especially suited for collecting droplets and condensate that can then be conveyed back to the steam-generating element. This is very advantageous since otherwise, condensed steam or droplets created during the steam generation could get into the oven chamber, which is undesirable.

The steam can also condense, at least partially, in the collecting area. The droplets or the condensate then flow, as described above, from the collecting area back to the steam-generating element and, in the process, advantageously along the water-conveying element. Consequently, the water-conveying element can also prevent that condensate that is flowing back can be entrained by the steam and get into the oven chamber. Preferably, at least one baffle or the like can be arranged in the collecting area and/or near the collecting area. Such a baffle is especially suitable and configured to convey the condensate from the collecting area and/or from an inner wall of the pipe element to the water-conveying element.

In an especially preferred embodiment, the water-conveying element comprises at least one fixed and/or flexible element. The element is especially suitable and configured to guide the water and to prevent the water from being diverted by flowing air or flowing steam. Here, the element can guide the water, at least partially, because of its shape. It is also possible for the element to interact with the water and thus to guide it, at least partially, through adhesion and/or capillary forces.

The fixed element can be configured as at least a web and/or bar or the like. Essentially, spiral windings can also be formed. It is also possible to have at least one channel and/or channel-like profile or some other profile that is suitable for conveying water. The flexible element can be configured as at least one chain and/or cable and/or rope or the like. It is also possible to use a spiral and/or a screen and/or a net or the like.

It is possible and preferable for the water-conveying element to extend inside a section of the pipe element, at least partially, essentially along the longitudinal axis of the pipe element. In particular, the water-conveying element is arranged essentially parallel to the flow direction of the inflowing water. As a result, the water can run especially well along the water-conveying element. Possible arrangements of the water-conveying element also include those that diverge from the longitudinal axis or are not parallel to the direction of flow. Preferably, the water can run along the water-conveying element due to the force of gravity and/or due to the pressure of the drinking water supply system.

The water-conveying element is preferably arranged at a distance from the inner wall of the pipe element, at least over part of the circumference and/or, in sections, over the entire circumference. In particular, the water-conveying element is connected to and/or joined to the pipe element in one piece, at least in sections, over at least part of the circumference.

In another embodiment, the water-conveying element is configured on at least one section of the inner wall of the pipe element. This at least one section of the inner wall of the pipe element that functions as a water-conveying element extends between the free-fall section and the steam outlet element, whereby this section of the inner wall of the pipe element is configured to be slanted in such a way that, when the cooking device is in the ready-to-use position, it rises from the free-fall section towards the steam outlet element. Due to the slant of this section of the inner wall of the pipe element that serves as the water-conveying element, in a simple and advantageous manner, fresh water coming in or flowing in from the fixed water connection as well as condensate or condensed water formed in the collecting area of the pipe element are prevented from flowing to the steam outlet element and from getting into the oven chamber via the steam outlet element. Especially preferably, the water-conveying element is configured on at least two sections of the inner wall of the pipe element. When the cooking device is in the ready-to-use position, a first section of the inner wall of the pipe element that functions as a water-conveying element extends adjacent to the upper section of the free-fall section, while a second section of the inner wall of the pipe element that functions as a water-conveying element extends adjacent to the lower section of the free-fall section. The first as well as the second section are configured to be slanted in such a way that, when the cooking device is in the ready-to-use position, they rise from the free-fall section towards the steam outlet element.

In a conceivable refinement, the water-conveying element is especially suitable and configured to convey 0.1 to 5 liters of water per minute and preferably 0.5 to 1 liter of water per minute. Smaller and/or larger volumes of water per minute are likewise possible.

At least one reservoir can be provided which is in flow-connection with the pipe element and with the steam-generating element and in which the fed-in water can be stored, at least partially. In particular, the reservoir is arranged in the direction of flow of the inflowing water upstream from the steam-generating element.

Preference is given to a reservoir in which water can be stored for approximately at least one steaming phase of a cooking process. Possibilities are 1 ml to 200 ml of water per steaming phase and preferably 20 ml to 100 ml of water per steaming phase, and especially preferably about 60 ml of water per steaming phase. For further steaming phases, water can be admitted and stored anew. Such a reservoir is advantageous since it can be accommodated in the cooking device in a very space-saving manner. However, a reservoir is also possible in which water for two or more, for example, for 20 or more, steaming phases can be stored.

It is also possible to provide for the reservoir to hold an additional non-evaporable volume of water that remains in the steam-generating element or in other parts of the water-conveying system. Possibilities here are 1 ml to 100 ml of water and especially 10 ml to 50 ml of water and preferably 15 ml to 20 ml of water.

In particular, at least one overflow element and/or venting element are provided that are in flow connection with the inlet element and/or with the reservoir and/or with the steam-generating element. The overflow element is suitable and configured to discharge excess water that is present in the steam-generating element or other parts of the water-conveying system. At least one valve element or the like can be provided for this purpose. The water can be discharged into a wastewater system and/or into an overflow tank. The venting element is suitable and configured to discharge excess air and/or steam, and especially the air displaced while the water is being admitted.

Especially preferably, the overflow element and/or the venting element are at least partially configured as a shared unit together with the steam outlet element. In particular, the steam outlet element is provided with at least one flow connection leading into the oven chamber, and it is configured to discharge excess water and air into the oven chamber. At least one valve element or the like can be provided for this purpose.

According to a preferred embodiment, the pipe element and the water-conveying element and the steam outlet element are configured as a one-piece molded part. Such a molded part is preferably made of a plastic material. Such an embodiment is advantageous since such molded parts are relatively inexpensive and simple to manufacture. Moreover, a wide array of shapes is possible in order to adapt the molded part to the space available in the cooking device. A two-part or multi-part version is also possible. The individual parts can be joined to each other, for example, in that they are snapped, glued, welded and/or screwed together, etc.

In another preferred embodiment, at least one valve element is provided by means of which the flow connection for the water can be regulated. Here, the valve element is arranged especially in the area of the connecting element or in an area of the pipe element downstream from the connecting element. The valve element can be operatively connected to at least one control unit. Preferably, the control unit regulates the opening and closing of the valve element. For example, in this manner, the appropriate volume of water can be admitted for each cooking process and/or for each steaming phase. The volume of water can depend on the cooking process or on the selected cooking program and/or on the size of the reservoir.

The valve element is especially configured as a solenoid valve and especially preferably as a double solenoid valve. Here, the double solenoid valve is configured in such a way that it is always on or always closed. The double solenoid valve opens the flow connection only when it is actuated and when electric current is supplied to it, for example, by the control unit. This is especially advantageous since the double solenoid valve remains closed, for example, in case of a power failure, and thus no water can inadvertently flow into the cooking device. However, it is also possible for the double solenoid valve to be always off or always closed.

The components and especially the non-metallic water-conveying components described here might require approval by the Food and Drug Administration (FDA) and/or by another official agency.

Figure 1:
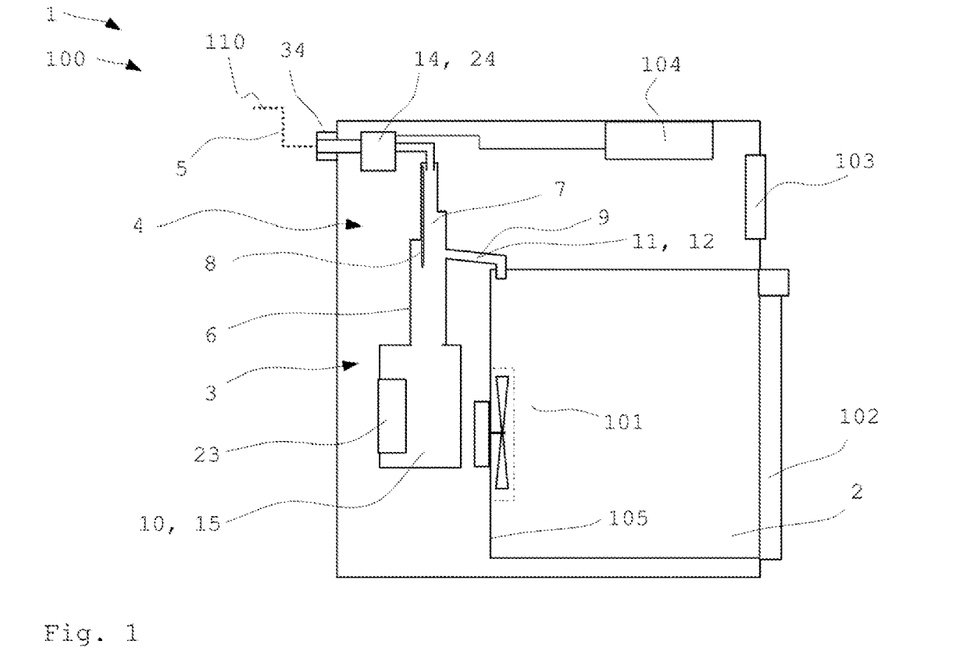
FIG. 1 shows a cooking device according to an embodiment of the invention, in a schematic cutaway side view.

FIG. 1 shows a cooking device 1 according to the invention. The cooking device 1 can be operated by a user by means of an operating element 103, and it has an oven chamber 2 that can be closed by a door 102 and that is partially surrounded by a wall 105. In the oven chamber 2, there is a heat source 101 that is configured here as a circulating air heater and that is provided to cook food items. Additional heat sources such as an upper heating element and a lower heating element as well as a microwave heating element or the like can also be provided.

The cooking device 1 is configured here as a combination device 100 that has a steam-cooking function for preparing food. For this purpose, a steam-generating element 3 is provided in order to generate steam. The steam is generated by means of a flow heater 23 and it is then fed into the oven chamber 2 via a steam outlet element 9 that is in flow-connection with the flow heater 23. In order to supply the steam-generating element 3 with water, a reservoir 10 is provided that is configured here as a tank 15. Here, the water is drawn into the tank 15 via coupling element 4 from a fixed water connection 5 of a drinking water supply system 110. For this purpose, the combination device 100 has a connecting element 34 that is coupled to the drinking water supply system 110. Here, the fixed water connection 5 is in flow connection with the tank 15 via the coupling element 4 and via a pipe element 6.

In order to draw in water to generate steam, a control unit 104 opens the valve element 14 that is configured as a double solenoid valve 24, as a result of which the water flows via the pipe element 6 into the tank 15. The air in the tank 15 or in the pipe element 6 can escape into the oven chamber 2 via the steam outlet element 9, which is configured as a venting element 12. The volume of water to be drawn in depends on which cooking program the user has selected. Here, the control unit 104 opens the double solenoid valve 24 and allows the appropriate volume of water into the tank 15, for example, for each cooking process and/or for each steaming phase. Then the control unit 104 closes the double solenoid valve 24 again.

In order to prevent the admitted water from being sucked back into the drinking water supply system 110, a free-fall section 7 is provided in the pipe element 6. The water can run down in the free-fall section 7 without any hindrance. As a result, no water can accumulate there that could be sucked back in. In fact, in case of negative pressure in the drinking water supply system 110, only air would be sucked in, and this air can flow through the venting element 12 or through the steam outlet element 9 out of the oven chamber 2. If the tank 15 or other parts of the water-conveying system should become overfilled, then the water can drain into the oven chamber 2 via the steam outlet element 9, which is configured as an overflow element 11. Advantageously, the overflow element 11 or the steam outlet element 9 are configured with a gradient at their ends facing the oven chamber so that the water can always reliably flow into the oven chamber and cannot accumulate in the overflow element 11. Thus, the free-fall section 7 is ensured, even in case of overfilling, and it is ruled out that water can be sucked back into the drinking water supply system 110. In fact, in case of negative pressure in the drinking water supply system 110, only air would be sucked in, and this air can flow through the free overflow element 11 or through the steam outlet element 9 out of the oven chamber 2.

A water-conveying element 8 is installed in one segment of the free-fall section 7. The water-conveying element 8 is especially advantageous since, as a result, no water or water droplets get into the oven chamber. Without the water-conveying element 8, the inflowing water would be entrained by the displaced air that escapes via the venting element 12 into the oven chamber. Thanks to the water-conveying element 8, however, such a deflection of the water is prevented. Here, the admitted water runs along the water-conveying element 8. The water-conveying element 8 here ends below the venting element 12 or below the steam outlet element 9, so that the water is conveyed as far as possible away from the entrance to the oven chamber.

Another advantage of the water-conveying element 8 is that, during the steaming operation, it is prevented that returning condensate is entrained into the oven chamber 2. During the steaming operation, the generated steam rises in the pipe element 6 and enters the oven chamber 2 via the steam outlet element 9. Steam that does not enter the steam outlet element 9 flows further upwards in the pipe element 6 and condenses there. The condensate subsequently flows at least partially via the water-conveying element 8 back to the steam-generating element 3.

Figure 2:
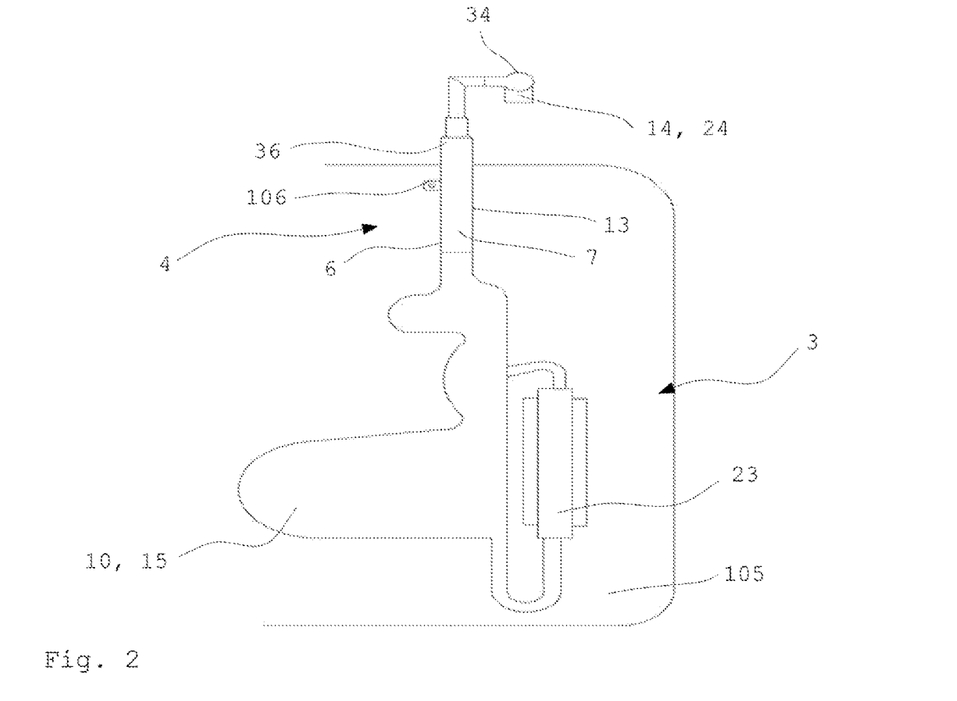
FIG. 2 shows a schematic depiction of a pipe with a steam-generating element.

FIG. 2 shows a steam-generating element 3 that, via a coupling element 4 and pipe element 6, is in flow-connection with a connecting element 5. The pipe element 6 here is attached to a holding element 106 on the outside of a wall 105 of the oven chamber 2. The steam outlet element 9 is not visible. The pipe element 6 is configured here as a molded part 13 made of a plastic material. Moreover, above the steam outlet element 9, the pipe element 6 has a collecting area 36 that is especially well-suited for collecting droplets and condensate. The collecting area 36 here is configured as a reduction of the diameter or as a constriction of the pipe element 6. During the steaming operation, the condensate or the droplets precipitate in the collecting area 36 and run along the water-conveying element 8 or on an inner wall 46 of the pipe element 6 back to the steam-generating element 3.

Figure 3:
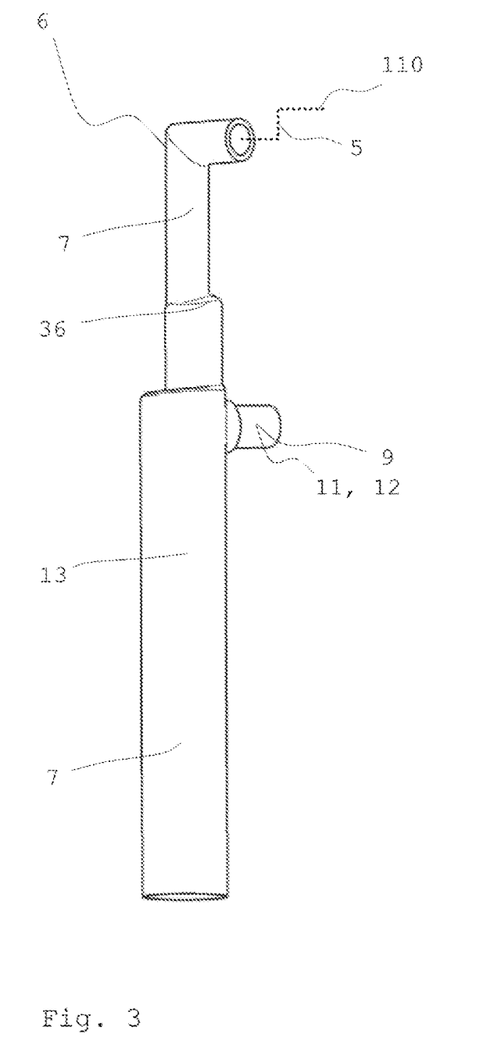
FIG. 3 shows a schematic perspective depiction of a pipe.

FIG. 3 shows the pipe element 6 of FIG. 2 in an enlarged, perspective view.

Figure 4:
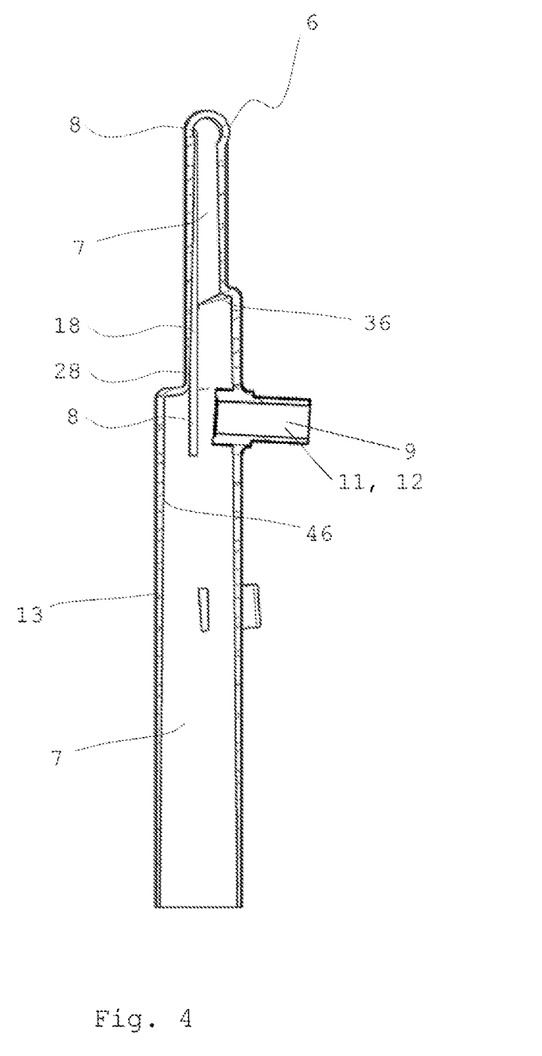
FIG. 4 shows a schematic cross section through the pipe of FIG. 3.

FIG. 4 shows a cross section through the pipe element 6 of FIG. 3. Here, the water-conveying element 8 inside the pipe element 6 can be easily recognized. The water-conveying element 8 starts together with the free-fall section 7 in the upper area of the pipe element 6. The end of the water-conveying element 8 is arranged below the steam outlet element 9. As a result, the admitted water is conveyed over a long segment of the free-fall section and in particular, it is not deflected in the area of the steam outlet element 9.

The water-conveying element 8 comprises a fixed element 18 that is configured as a web 28. Here, the web 28 extends along the longitudinal axis of the pipe element 6 as well as essentially parallel to the direction of flow of the inflowing water. Thanks to this arrangement, the web 28 can guide the water particularly well.

Here, the web 28 and the pipe element 6 as well as the steam outlet element 9 are made of a plastic material as a one-piece molded part 13. The height of the web 28 increases in the direction of flow. In the upper area of the pipe element 6 and essentially above the steam outlet element 9, the web 28 is arranged at a distance from the inner wall 46 over part of the circumference. In the lower area of the pipe element 6 and essentially below the steam outlet element 9, the web 28 is arranged at a distance from the inner wall 46 over the entire circumference. As a result, on the one hand, it can be achieved that the water runs well and, on the other hand, the free flowing of the water in the free-fall section is not hindered.

Figure 5:
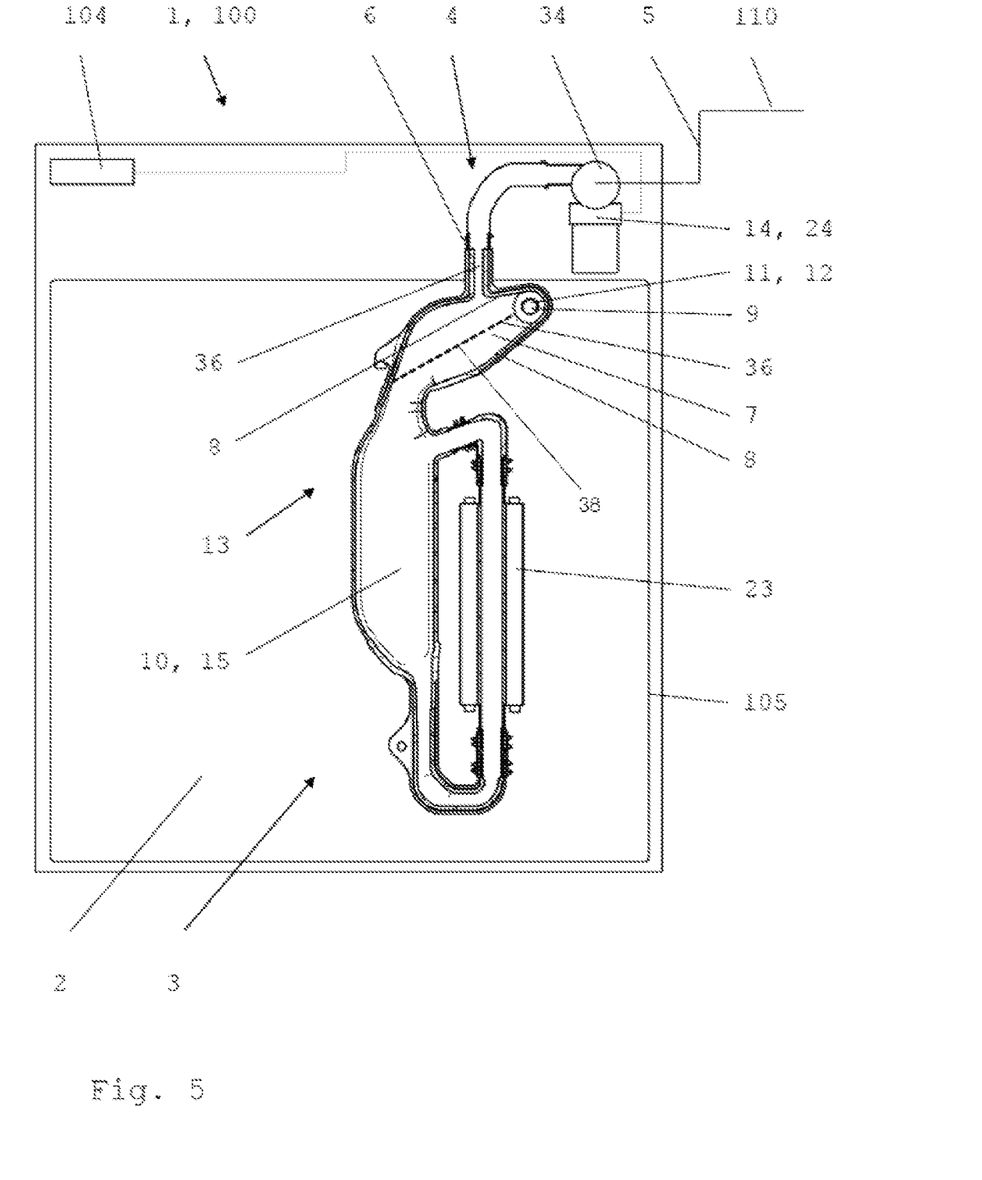
FIG. 5 shows a cooking device according to another embodiment of the invention, in a schematic cutaway rear view.

FIG. 5 shows another embodiment of a cooking device 1 according to the invention. The same or functionally equivalent components are provided with the same reference numerals that were used for FIGS. 1 through 4. This also applies to FIGS. 6 and 7.

The cooking device 1 shown in FIG. 5 also has an operating element, an oven chamber 2 that can be closed by a door and that is partially surrounded by a wall 105. In the oven chamber 2, at least one heat source is provided for cooking food. FIG. 5 shows the cooking device in a schematic cutaway rear view For this reason, the operating element, the door and the heat source cannot be seen here. However, the back wall 105 of the oven chamber 2 as well as a steam-generating element 3 for generating steam that is associated with the oven chamber 2 can be seen, since this cooking device 1 is also configured as a combination device 100 that has a steam-cooking function for preparing food.

The steam-generating element 3, along with the coupling element 4, the connecting element 34, the valve element 14 and the pipe element 6 are arranged adjacent to the back wall 105 of the oven chamber. In FIG. 5, the pipe element 6 and the steam-generating element 3 are shown in a cutaway view. A back wall of the cooking device 1 is not shown in FIG. 5.

The steam is generated by means of the flow heater 23 of the steam-generating element 3 and it is then fed into the oven chamber 2 via a steam outlet element 9 that is in flow connection with the flow heater 23. In order to supply the steam-generating element 3 with water, a reservoir 10 is provided that is configured here as a tank 15. Here, the water is drawn into the tank 15 via coupling element 4 from a fixed water connection 5 of a drinking water supply system 110. For this purpose, the combination device 100 has a connecting element 34 that is coupled to the drinking water supply system 110. Here, the fixed water connection 5 is in flow connection with the tank 15 via the coupling element 4 and via a pipe element 6.

In order to draw in water to generate steam, a control unit 104 opens the valve element 14 that is configured as a double solenoid valve 24, as a result of which the water flows via the pipe element 6 into the tank 15. The air in the tank 15 or in the pipe element 6 can escape into the oven chamber 2 via the steam outlet element 9, which functions as a venting element 12. The volume of water to be drawn in depends on which cooking program the user has selected. Here, the control unit 104 opens the double solenoid valve 24 and allows the appropriate volume of water into the tank 15, for example, for each cooking process and/or for each steaming phase. Then the control unit 104 closes the valve element 24 again.

In order to prevent the admitted water from being sucked back into the drinking water supply system 110, a free-fall section 7 is provided in the pipe element 6. The water can run down in the free-fall section 7 without any hindrance. As a result, no water can accumulate there that could be sucked back in. In fact, in case of negative pressure in the drinking water supply system 110, only air would be sucked in, and this air can flow through the venting element 12 or through the steam outlet element 9 out of the oven chamber 2. If the tank 15 or other parts of the water-conveying system should become overfilled, then the water can drain into the oven chamber 2 via the steam outlet element 9, which functions as an overflow element 11. Thus, a free-fall section is ensured, even in case of overfilling, and it is ruled out that water can be sucked back into the drinking water supply system 110. In fact, in case of negative pressure in the drinking water supply system 110, only air would be sucked in, and this air can flow through the free overflow element 11 or through the venting element 12 or through the steam outlet element 9 out of the oven chamber 2.

Moreover, above the steam outlet element 9, the pipe element 6 has a collecting area 36 that is especially well-suited for collecting droplets and condensate. During the steaming operation, the generated steam rises in the pipe element 6 and enters the oven chamber 2 via the steam outlet element 9. Steam that does not enter the steam outlet element 9 condenses in the collecting area 36. The condensate subsequently flows at least partially via the pipe element 6 back to the steam-generating element 3.

The pipe element 6 as well as the reservoir 10 are configured here as a molded part 13 made of a plastic material.

In this embodiment as well, a water-conveying element 8 is installed in one section of the free-fall section 7, which has the effect that, when water is admitted, no water or water droplets get(s) into the oven chamber through the steam outlet element 9. The water-conveying element 8 is located inside the pipe element 6. To put it more precisely, the water-conveying element 8 is configured on at least two sections of the inner wall of the pipe element 6. When the cooking device 1 is in the ready-to-use position, as shown in FIG. 5, a first section of the inner wall of the pipe element 6 that functions as a water-conveying element extends adjacent to the upper section of the free-fall section 7, while a second section of the inner wall of the pipe element 6 that functions as a water-conveying element 8 extends adjacent to the lower section of the free-fall section. Both of the sections that serve as the water-conveying element 8 are configured to be slanted in such a way that they rise from the free-fall section 7 towards the steam outlet element 9. Due to the slant of these sections of the inner wall of the pipe element 6 that serve as the water-conveying element 8, in a simple and advantageous manner, fresh water coming in or flowing in from the fixed water connection as well as condensate or condensed water formed in the collecting area 36 of the pipe element are prevented from flowing to the steam outlet element 9 and from getting into the oven chamber via the steam outlet element 9. On the contrary, the slant of these sections of the inner wall of the pipe element 6 that serve as the water-conveying element 8 cause water and/or condensate to be carried away from the steam outlet element 9 and into the tank 15.

Figure 6:
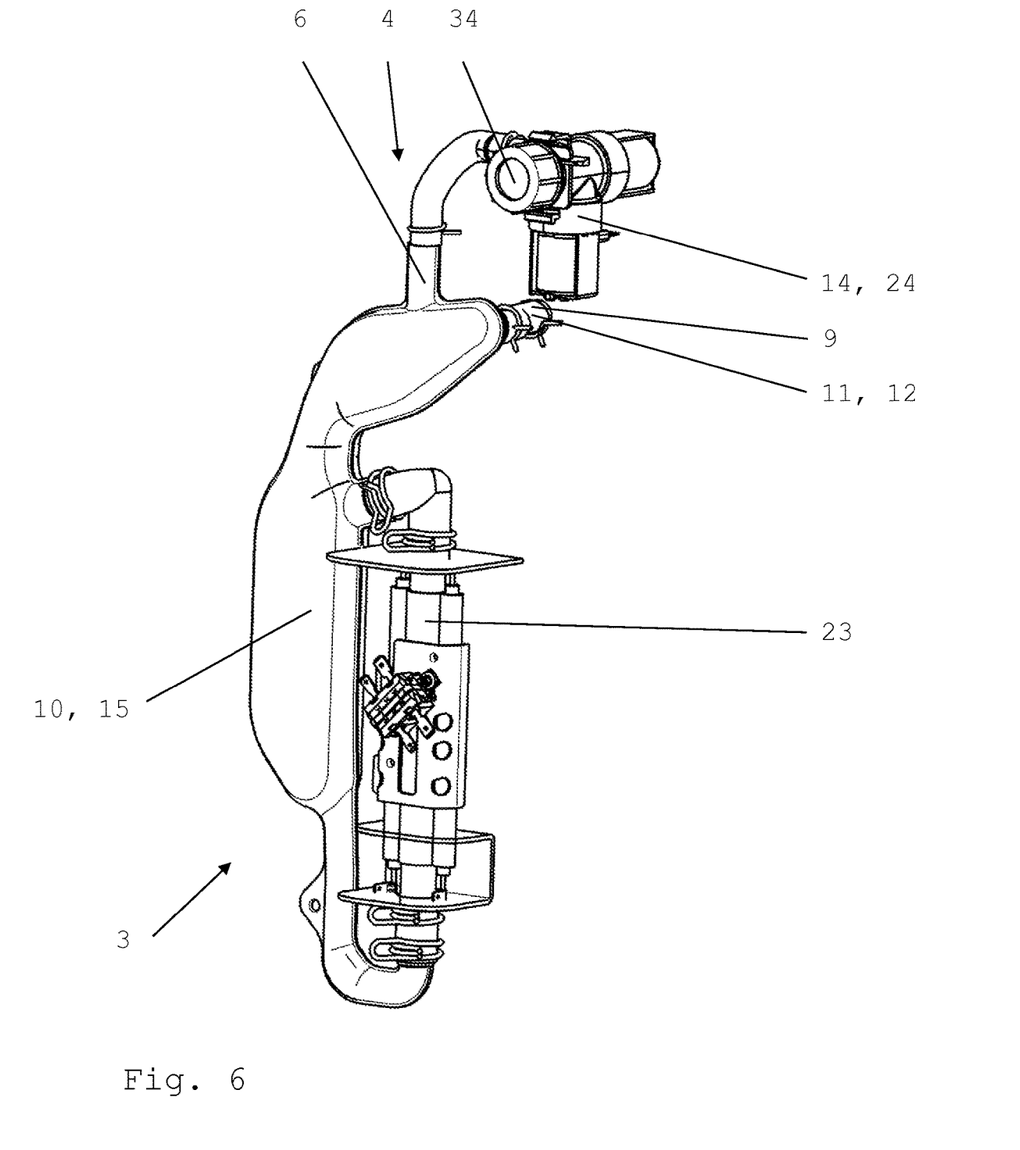
FIG. 6 shows a schematic perspective view of a coupling element having a connecting element, a pipe element and a steam-generating element, as seen from the rear end.

FIG. 6 shows the steam-generating element 3 that was described above with reference to FIG. 5, along with the coupling element 4, the connecting element 34, the valve element 14 and the pipe element 6 in a perspective view as seen from the rear.

Figure 7:
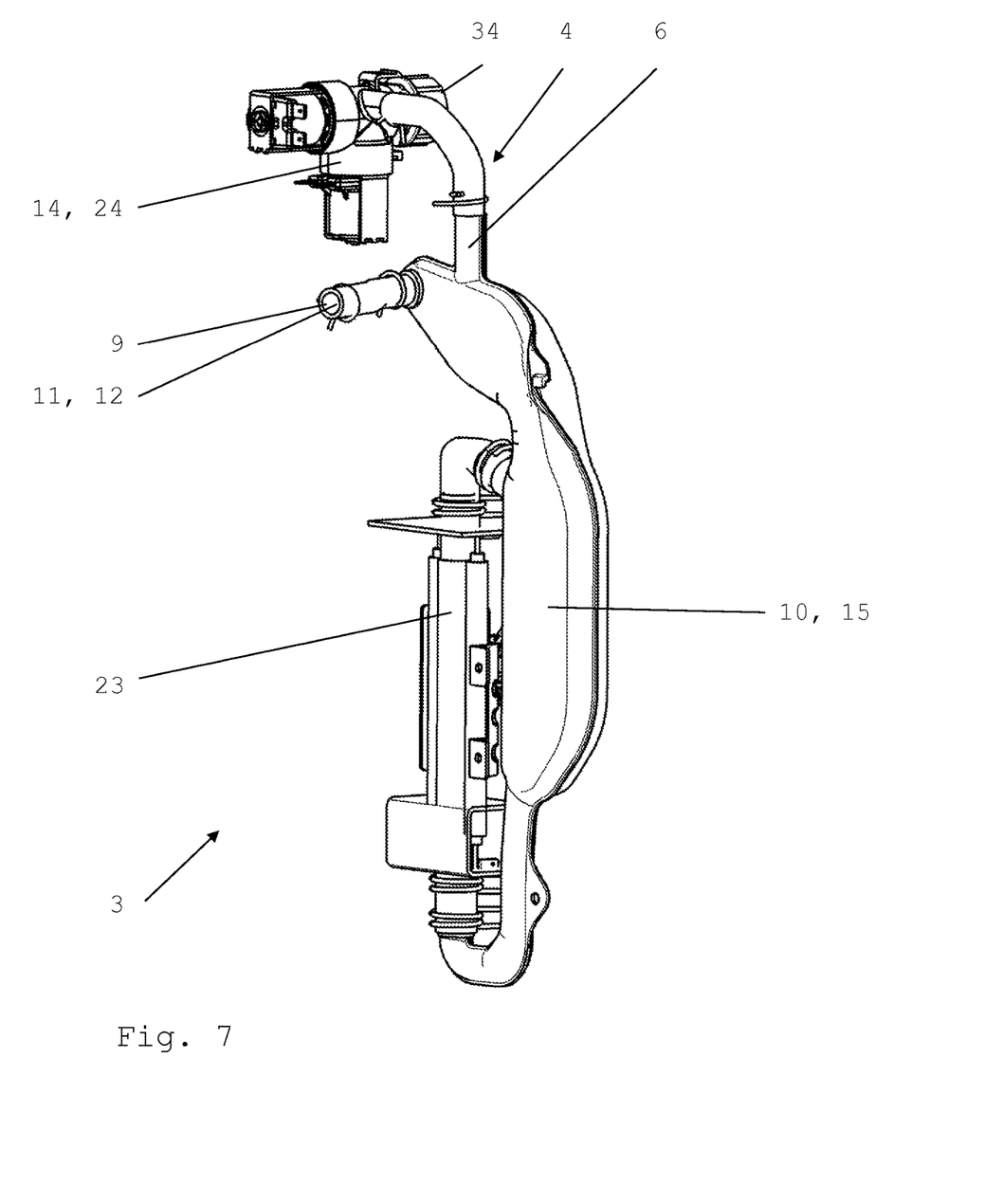
FIG. 7 shows a schematic perspective view of the coupling element having the connecting element, the pipe element and the steam-generating element of FIG. 6, as seen from the front.

FIG. 7 shows the steam-generating element 3 that was described above with reference to FIG. 5, along with the coupling element 4, the connecting element 34, the valve element 14 and the pipe element 6 in a perspective view as seen from the front.

The present invention puts forward a cooking device 1 with a steam-generating element 3 that can be coupled via a coupling element 4 to a fixed water connection 5. In order to prevent the admitted water from being sucked back into the lines of the fixed water connection 5 or into the drinking water supply system 110, a free-fall section 7 is provided in which, at least partially, a water-conveying element 8 is arranged. The water-conveying element 8 allows a deflection-free channeling of the inflowing water, as a result of which the water is no longer deflected, for instance, into the oven chamber 2.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 cooking device
2 oven chamber
3 steam-generating element
4 coupling element 5 fixed water connection
6 pipe element
7 free-fall section
8 water-conveying element
9 steam outlet element
10 reservoir
11 overflow element
12 venting element
13 molded part
14 valve element
15 tank
18 element
23 flow heater
24 double solenoid valve
28 web
34 connecting element
36 collecting area
46 inner wall
100 combination device
101 heat source
102 door
103 operating panel
104 control unit
105 wall
106 holding element
110 drinking water supply system

What is claimed is:

1. A cooking device comprising:
at least one oven chamber operable to receive food that is to be cooked;
a steam-generating element for generating steam, the steam-generating element including at least one reservoir configured to store, at least partially, water used for generating the steam;
a coupling element through which the water used for generating the steam is fed, at least in part, to the steam-generating element, the coupling element including a connecting element configured to connect to a fixed water connection;
a steam outlet element; and
a pipe element disposed between the coupling element and the steam-generating element, the pipe element including a free-fall section, a vertically extending portion disposed above the free-fall section, the vertically extending portion being connected to the coupling element, and a water-conveying element at least partially disposed in the free-fall section of the pipe element, the water-conveying element being comprised of at least two sections of an inner wall of the pipe element, a first section of the inner wall extending adjacent to an upper section of the free-fall section, and a second section of the inner wall extending adjacent to a lower section of the free-fall section, the pipe element, within its walls, separating steam being outlet from water being fed
wherein the pipe element is connected at a lower end thereof to the at least one reservoir and at an upper end thereof to the steam outlet element, the steam outlet element being disposed above the free-fail section, and
wherein the first section of the inner wall of the pipe element extends, from a lower end of the vertically extending portion, upward and toward the steam outlet element, and the second section of the inner wall of the pipe element extends upward and toward the steam outlet element.

2. The cooking device according to claim 1, wherein the steam outlet element is disposed, at least partially, in an area of the water-conveying element.

3. The cooking device according to claim 2, wherein the water-conveying element at least one of starts above the steam outlet element or extends to below the steam outlet element.

4. The cooking device according to claim 1, wherein the steam outlet element is disposed at a distance from the connecting element, and the pipe element has a collecting area above the steam outlet element that is configured for collecting droplets and condensate.

5. The cooking device according to claim 1, wherein the water-conveying element includes at least one of at least one fixed element or a flexible element.

6. The cooking device according to claim 1, wherein the water-conveying element extends inside a section of the pipe element, at least partially, along a longitudinal axis of the pipe element.

7. The cooking device according to claim 1, wherein at least one of at least one overflow element or at least one venting element are provided that are in flow connection with at least one of the pipe element or the at least one reservoir or the steam-generating element.

8. The cooking device according to claim 7, wherein at least one of the at least one overflow element or the at least one venting element is at least partially configured as a shared unit together with a steam outlet element of the pipe element.

9. The cooking device according to claim 1, wherein the pipe element, the water-conveying element, and the steam outlet element are configured as a one-piece or two-piece molded part.

10. The cooking device according to claim 1, further comprising a valve element configured to regulate a flow connection for the water, wherein the valve element is disposed in an area of the connecting element or in an area of the pipe element downstream from the connecting element.

* * * * *